United States Patent [19]
Kathmann et al.

[11] Patent Number: 5,561,609
[45] Date of Patent: Oct. 1, 1996

[54] TRANSMISSION SYSTEM WITH RECONSTRUCTION OF MISSING SIGNAL SAMPLES

[75] Inventors: Eric Kathmann; Robert J. Sluijter, both of Eindhoven, Netherlands

[73] Assignee: U.S. Philips Corporation, New York, N.Y.

[21] Appl. No.: 283,449

[22] Filed: Aug. 1, 1994

[30] Foreign Application Priority Data

Aug. 2, 1993 [BE] Belgium ............................... 09300802

[51] Int. Cl.$^6$ .................................................. G08C 25/00
[52] U.S. Cl. ...................................... 364/514 R; 455/67.3
[58] Field of Search ........................... 364/514 R; 395/2, 395/2.1, 2.22, 2.42; 371/31, 38.1, 40.2; 455/67.3; 375/60, 95, 99

[56] References Cited

U.S. PATENT DOCUMENTS 4,975,956  12/1990  Liu et al. .................................... 381/36
5,025,404  6/1991  Janssen et al. ........................... 364/723

OTHER PUBLICATIONS

Kleijn et al., "Methods for Waveform Interpolation in Speech Coding", Digital Signal Processing, vol. 1, No. 4, Oct. 1991, pp. 215–230.

"Linear Prediction: A Tutorial View" by J. Makhoul in Proceedings of the IEEE, vol. 63, No. 4, Apr. 1975.

*Primary Examiner*—Emanuel T. Voeltz
*Assistant Examiner*—Thomas Peeso
*Attorney, Agent, or Firm*—Leroy Eason

[57] ABSTRACT

A digital transmission system wherein only certain of the samples in a series of signal samples are transmitted by the transmitter to a receiver over a channel. In addition, various characteristic parameters of the series of signal samples are determined in the transmitter and transmitted to the receiver. The characteristic parameters are used at the receiver to reconstruct the missing single samples by assigning to them values such that the resulting reconstructed series of signal samples approximates the characteristic parameters as closely possible. If the series has a periodicity having a period longer than the time duration of the series of signal samples, reconstruction of the series may have a considerable interpolation error. By determining such period in the transmitter and transmitting it over the channel to the receiver, where the same periodicity is introduced into the reconstructed series of signal samples, the interpolation error is considerably reduced.

13 Claims, 3 Drawing Sheets

TRANSMISSION SYSTEM WITH RECONSTRUCTION OF MISSING SIGNAL SAMPLES

BACKGROUND OF THE INVENTION

1. Field of the Invention

The invention relates to a transmission system for sequentially transmitting signal samples, from a transmitter to a receiver. The a transmitter includes characterization means for determining parameters characteristic of the signal samples, and means for transmitting the characteristic parameters and at least some of the signal samples over the channel to a receiver. The receiver includes interpolation means for determining the value of missing signal samples to obtain successive series of signal samples so as having characteristic parameters that correspond to the received characteristic parameters.

In addition, the invention relates to a transmitter, a receiver, a coder and a decoder to be used in such a transmission system, as well as an interpolator and an interpolation method.

2. Description of the Related Art

A transmission system as defined in the opening paragraph is known from U.S. Pat. No. 5,025,404.

Such transmission systems are used, for example, for transferring speech or musical signals over channels having a limited transmission capacity or over channels on which so-called burst errors occur.

A first example of such a channel is a radio channel between a mobile station and a fixed base station. The available transmission capacity of this channel is limited, because it is utilized by a great many users. Besides, there may be periods in which, as a result of fading, the probability of the occurrence of burst errors is rather great.

A second example is a recording channel which utilizes a magnetic, optical or other recording medium such as, for example, a ROM. The capacity thereof is limited, and in some of these recording media burst errors may occur when the recorded samples are reproduced.

In the transmitter the prior-art transmission system, characteristic parameters are determined of the signal samples to be transferred. This may be effected by determining linear prediction parameters which describe the relation between current signal samples and previous signal samples. These parameters are determined in such a way that the error between the current signal sample, estimated on the basis of the previous signal samples, and the actual value of the current signal sample is minimized. The characteristic parameters are transferred to the receiver over the channel together with (a number of) the signal samples.

If a saving on transmission capacity is desired, only some of the signal samples are transferred over the channel. The samples that have not been transferred are then determined at the receiver on the basis of the received characteristic parameters which provide information about the nature of the signal and the samples that have indeed been transferred.

If the signal samples to be transferred are desired to be protected against burst errors, all the signal samples can be transferred besides the characteristic parameters. In the receiver the erroneously received samples are then detected on the basis of the characteristic parameters and the correctly received signal samples. The erroneously received samples are then considered to be missing.

In the transmitter the characteristic parameters are determined which best describe the complete range of signal samples, whereas in the receiver, based on the received characteristic parameters and the values of the (correctly) received signal samples, the values of the missing signal samples are determined. The values of the reconstructed signal samples will generally not be exactly equal to the values of the original signal samples, and so an interpolation error will show up. The missing signal samples are determined such that this interpolation error is minimized.

Simulations have shown that in some speech and musical signals the minimum value of the interpolation error continues to be considerable. In addition, listening tests have proved that the quality of the received signal leaves much to be desired.

SUMMARY OF THE INVENTION

It is an object of the invention to provide a transmission system as defined in the opening paragraph, in which the interpolation error is reduced considerably and hence the audible quality of the received signal is improved considerably.

For this purpose, the invention is characterized in that the transmitter comprises period determining means for determining the period value of a periodicity in the signal samples, which period value exceeds the time duration of each series of signal samples, and means for transmitting the period value over the channel to the receiver. The interpolation means in the receiver comprises period introducing means for introducing a periodicity having a period that corresponds to the received period value in the signal samples determined by the interpolation means.

The invention is based on the recognition that in the transmit signal which is transmitted over the channel as successive series of signal samples, periodicities occur having a period larger than the time duration of each of the series of signal samples. Consequently, the period value of these periodicities cannot be determined by interpolation from the signal samples that occur in a given series of signal samples. As a result, the interpolation error will be considerable at some instants. The instants at which there is a maximum interpolation error have time spacings equal to the period value.

By determining in the transmitter the period of such a periodicity with the aid of the period determining means, and introducing this periodicity by the period introducing means in the receiver into the signal samples derived by the interpolation means, a reconstructed succession of series of signal samples in which the periodicity is fully present are obtained at the output of the receiver. Simulations and listening tests have indeed shown that the quality of the reconstructed signal has improved considerably due to measures according to the inventive idea.

It is noted that it is possible, in principle, to reduce the interpolation error by increasing the number of signal samples in each series of signal samples. However, this requires a considerable increase of the number of characteristic parameters, so that a likewise increased number of missing signal samples can be determined from the known signal samples with sufficient accuracy. This increase of the number of characteristic parameters would lead to an unacceptable enhancement of the complexity of the transmitter. In addition, the increase of the number of characteristic parameters would require a considerably larger transmission capacity of the channel.

An embodiment of the invention is characterized in that the period determining means are likewise arranged for determining an amplitude coefficient of the periodicity and in that the period introducing means are arranged for setting the amplitude coefficient of the periodicity to the attenuation factor determined by the period determining means.

Generally, the amplitude of the periodicity in the signal samples will not be constant, but will vary between zero and a maximum value. These variations can be described by an amplitude coefficient. The amplitude coefficient may be a measure, for example, of the ratio between the amplitudes of two successive periods of the periodicity. If the amplitude coefficient exceeds unity, the amplitude of the periodicity increases with time. If the amplitude coefficient equals unity, the amplitude of the periodicity remains constant, whereas in the event of an amplitude coefficient smaller than unity, the amplitude of the periodicity decreases with time.

By determining not only the period value but also an amplitude coefficient of the periodicity in the transmitter, and using these values also in the receiver for setting the period introducing means, the transmission quality of the transmission system is further improved.

A further embodiment of the invention is characterized in that the transmitter comprises local interpolation means for determining non-transmitted signal samples from transmitted signal samples to obtain a reconstructed series of signal samples having characteristic parameters that correspond to the characteristic parameters determined by the characterization means, the local interpolation means comprising local period introducing means for introducing a periodicity having a period value period determining means are arranged for selecting the period value so that the reconstructed series of signal samples correspond to the original series of signal samples as closely as possible.

By determining the period value and/or the amplitude coefficient of the periodicity from a local interpolation carried out in the transmitter, it is achieved that this period value and/or amplitude coefficient of the periodicity is/are determined so as to produce a minimum interpolation error, so that an optimum quality is ensured for determining the period value or amplitude coefficient.

A preferred embodiment of the invention is characterized in that the characterization means comprise window means for weighting a succession of series of signal samples with a window, so that the characteristic parameters are determined, and in that the actually transmitted series of signal samples are the last signal samples of the succession of series.

In many cases the value of characteristic parameters is derived from signal samples over an interval larger than the period of time of each of the series of signal samples. The signal samples are then often multiplied by a so-called window function which is maximum in the middle of the interval and decreases to about zero towards the boundaries of the interval. In the transmission system according to the state of the art the transmitted series of signal samples lies in the middle of the interval. As a result, there is an additional delay on transmission of the that series of signal samples, which delay is about equal to half the interval, which is undesired. By having the transmitted series of signal samples coincide with the end of the interval, the additional transmission delay is reduced to substantially zero by implementing the window function. Listening tests and simulations have proved that this measure causes hardly any loss of transmission quality.

BRIEF DESCRIPTION OF THE DRAWINGS

The invention will be further explained with reference to the drawings, in which.

DESCRIPTION OF THE PREFERRED EMBODIMENTS

Figure 1:
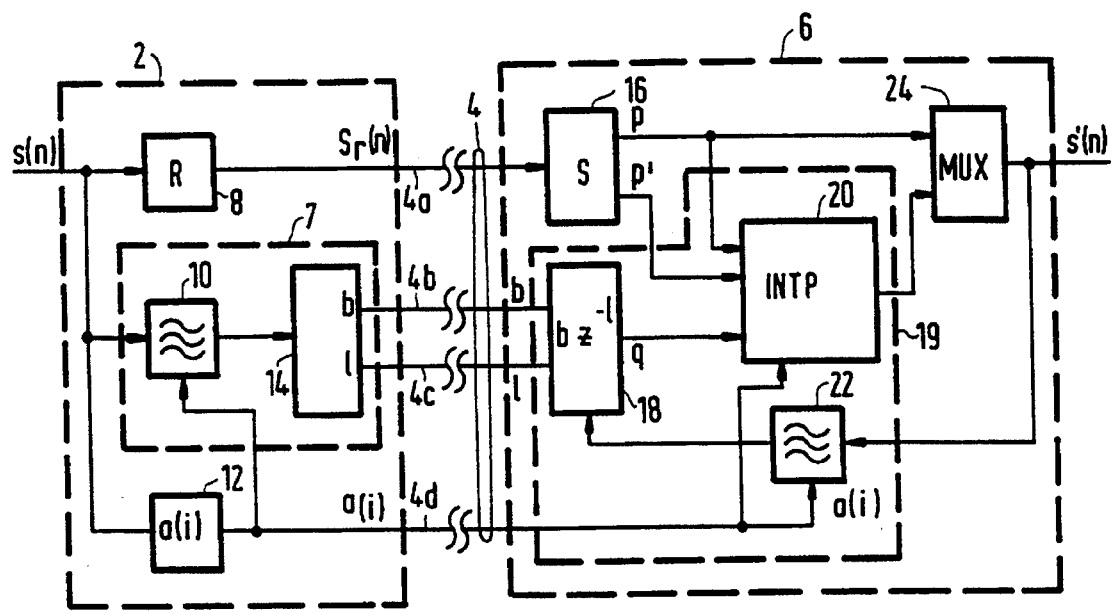
FIG. 1 shows a transmission system according to the invention.

In the transmission system shown in FIG. 1 signal samples s(n) are applied to an input of a transmitter 2. The input of the transmitter 2 is connected to a reducing element 8, to an input of the period determining means 7 and to an input of the characterization means in this transmitter formed by a linear predictor 12 for determining prediction parameters. The output of the reducing element 8 is connected to a first sub-channel 4a of the channel 4.

The period determining means 7 comprise a cascade combination of a prediction filter 10 and period measuring means 14. The outputs of the period determining means 7, carrying for their output signals the amplitude coefficient and period of the periodicity in the signal samples, are connected to the sub-channels 4b and 4c of the channel 4. The output of the linear predictor 12 is connected to a sub-channel 4d of the channel 4 and to a control input of the prediction filter 10.

The output of the sub-channel 4a is connected to a storage unit 16 in a receiver 6. A first output of the storage unit 16, carrying the most recent series of signal samples for its output signal, is connected to a first input of interpolation means 19 and to a first input of a multiplexer 24. A second output of the storage unit 16, carrying the most recent-but-one series of signal samples for its output signal, is connected to a second input of the interpolation means 19. An output of the interpolation means 19 is connected to a second input of the multiplexer 24. The output of the multiplexer 24 is connected to the output of the receiver and to a third input of the interpolation means 19. The outputs of the sub-channels 4b and 4c are connected to first and second control inputs of the interpolation means 19. The output of sub-channel 4d is connected to a third control input of the interpolation means 19.

The first input of the interpolation means 19 is connected to a first input of an interpolator 20, the second input of the interpolation means 19 being connected to a second input of the interpolator 20. The third input of the interpolation means 19 is connected to an input of a prediction filter 22.

The first control input of the interpolation means is connected to a first control input of the period introducing means 18, a second control input of the interpolation means 19 being connected to a second control input of the period introducing means 18. The third control input of the interpolation means is connected to a control input of the inverse prediction filter 22 and to a control input of the interpolator 20. The output of the inverse prediction filter 22 is connected to an input of the period introducing means 18, the output of the period introducing means 18 being connected to a third input of the interpolator 20.

In the transmission system shown in FIG. 1 it is assumed that the signal samples s(n) comprise successive series of p+m symbols each. From these p+m signal samples the reduction element 8 removes m signal samples, so that no more than p samples per series of p+m signal samples are transmitted over the sub-channel 4a. The removal of m signal samples is effected to reduce the necessary transmission capacity of the sub-channel 4a. For reconstructing the non-transmitted signal samples at the receiver 6, the linear predictor in transmitter 2 produces prediction parameters. These prediction parameters indicate how much a signal sample depends on a plurality of preceding signal samples. For an estimate $\hat{s}(n)$ of a signal sample s(n) there may be written:

$$\hat{s}(n) = -\sum_{i=1}^{N} a(i) \cdot s(n-i) \quad (1)$$

In (1) N is the order of prediction denoting how many samples from the past have been incorporated in the prediction. For the difference e(n)=s(n)−s'(n) there is found:

$$e(n) = s(n) - \hat{s}(n) = \sum_{i=0}^{N} a(i) \cdot s(n-i) \quad a(0) = 1 \quad (2)$$

For the mean square error E for a number of signal samples it then holds:

$$E = \sum_{n=n_1}^{n=n_2} \left( \sum_{i=0}^{N} a(i) \cdot s(n-i) \right)^2 \quad (3)$$

The predictor 12 computes the values of a(i) for which E has a minimum value. The manner of determining the prediction coefficients is described in detail in the Journal article "Linear Prediction: A Tutorial View" by J. Makhoul in Proceedings of the IEEE, Vol. 63, No. 4, April 1975. The prediction parameters are a(1) to a(N) inclusive, are transmitted over the sub-channel 4d to the receiver. The prediction filter 10, whose prediction parameters are set to the values computed by the linear predictor 12, derives the prediction error e(n) from the signal samples s(n) according to (2). The period measuring means 14 derive from the error signal e(n) the period and the amplitude coefficient of the periodicity having a period exceeding the period of time of each series of signal samples. The period measuring means 14 use the signal e(n) instead of s(n) as an input signal, because the parameters of the periodicity in the signal e(n) are necessary in the receiver for reintroducing this periodicity into the series of signal samples. The parameter b denotes the amplitude coefficient of the periodicity, whereas the parameter 1 denotes the period of the periodicity expressed in numbers of signal samples.

The amplitude coefficient b and the period value 1 are transmitted to the receiver over the sub-channels 4b and 4c.

It is noted that the transmission capacity necessary for transferring the prediction parameters may be considerably smaller than the transmission capacity necessary for transmitting the m missing signal samples. The sub-channels 4a–4d, for example, may be formed by time slots in a multiplex frame transmitted over a single transmission channel 4. Other forms of multiplexing, such as, for example, frequency multiplexing, are conceivable for transferring information of the four sub-channels 4a–4d.

The storage unit 16 stores the series of signal samples received from the sub-channel 4a. Besides the most recent series p of signal samples, also the most recent-but-one series p' of signal samples is present in the storage unit 16. The two series of signal samples p and p' are applied to an interpolator 20. The m interpolated signal samples are combined with the p received signal samples by the multiplexer to form a complete series s'(n) of signal samples. The prediction filter 22 computes the prediction error e'(n) from the series of signal samples s'(n) in response to the received prediction parameters. The period introducing means 18 determine a prediction error e'(n), delayed by 1 sampling periods and multiplied by a factor b, in response to the received values of b and 1. The output signal of the period introducing means 18 provides for the reintroduction of the periodicity in the interpolated series of signal samples. The combination of interpolator 20, multiplexer 24, prediction filter 22, period introducing means 18 may be considered a resonance circuit having a resonance period and an attenuation factor determined by the parameters 1 and b, which resonance circuit is activated by the periodicity occurring in the series of p signal samples. As a result, the periodicity is also introduced into the series of m signal samples which originally also had this periodicity.

When the m signal samples are reconstructed by the interpolator, it is assumed that a prediction error D is minimized in response to a signal d(n), where d(n) is equal to e'(n)−b·e'(n−1)=e'(n)−q(n). The reason for this is that if e'(n) is recurrent, the output signal b(n) will be equal to zero if b and 1 have the correct value. By minimizing D there is achieved that in the signal e(n) and thus in the signal s'(n) the periodicity is available with a correct amplitude coefficient and period. If there is assumed that the order N of prediction is equal to the number of signal samples involved in the interpolation, which is equal to 2p+m−1, the prediction error D may be written as:

$$D = \sum_{n=p}^{2p+m-1} d^2(n) = \sum_{n=p}^{2p+m-1} \{e(n) - q(n)\}^2 \quad (4)$$

It is then assumed that the prediction error is minimized in the missing and the subsequent available signal samples. Furthermore, there is assumed that 1 exceeds p+m. The value of the missing signal samples may now be found by setting the derivative of D with respect to the missing signal samples equal to zero. Then the following holds:

$$\frac{\partial D}{\partial s(k)} = 2 \sum_{n=p}^{2p+m-1} a(n-k) \cdot \left\{ \sum_{i=1}^{p} a(i)s(n-i) - q(n) \right\} = 0 \quad (5)$$

As s(k) only affects E from n=k to n=k+p inclusive, (5) is transposed into:

$$\frac{\partial D}{\partial s(k)} = 2 \sum_{n=k}^{k+p} a(n-k) \cdot \left\{ \sum_{i=0}^{p} a(i)s(n-i) - q(n) \right\} = 0 \quad (6)$$

Substitution of (2) in (6) results in:

$$\sum_{n=k}^{k+p} a(n-k) \cdot e(n) = 0 \quad p \leq k \leq p+m-1 \quad (7)$$

(7) defines m comparisons for the m different values of k from p to p+m+1 inclusive. These m comparisons may be written in a matrix as follows:

$$\begin{pmatrix} a_0 & \ldots & \ldots & a_p & 0 & 0 \\ 0 & \cdot & & & \cdot & 0 \\ & & \cdot & & & \\ 0 & 0 & a_0 & \ldots & \ldots & a_p \end{pmatrix} \left( \begin{pmatrix} e(p) \\ \vdots \\ \vdots \\ e(2p+m-1) \end{pmatrix} - \begin{pmatrix} q(p) \\ \vdots \\ \vdots \\ q(2p+m-1) \end{pmatrix} \right) = A(\underline{e} - \underline{q}) = \underline{0} \quad (8)$$

Herein A is an m by p+m matrix and e is a column vector having m elements. Utilizing (2) there is found for vector e:

$$\underline{e} = B\underline{s} = \begin{pmatrix} a_p & \ldots & \ldots & a_0 & 0 & 0 & 0 & 0 & 0 \\ 0 & \cdot & & & \cdot & 0 & 0 & 0 & 0 \\ & & \cdot & & & & & & \\ 0 & 0 & \cdot & & & \cdot & 0 & 0 & 0 \\ & & & \cdot & & & & & \\ 0 & 0 & 0 & \cdot & & & \cdot & 0 & 0 \\ & & & & \cdot & & & & \\ 0 & 0 & 0 & 0 & \cdot & & & \cdot & 0 \\ 0 & 0 & 0 & 0 & 0 & a_p & \ldots & \ldots & a_0 \end{pmatrix} \begin{pmatrix} s(0) \\ \vdots \\ \vdots \\ \vdots \\ \vdots \\ s(2p+m-1) \end{pmatrix} \quad (9)$$

In (9) B is a p+m by 2p+m matrix and s is a column vector having 2p+m elements. Substitution of (9) in (8) produces:

$$AB\underline{s} - A\underline{q} = R\underline{s} - A\underline{q} = 0 \quad (10)$$

Elaboration of the matrix multiplication AB results in;

$$R = \begin{pmatrix} r_p & \ldots & \ldots & r_1 & r_0 & r_1 & r_2 & \ldots & \ldots & r_{m-2} & r_{m-1} & r_p & 0 & 0 & 0 & 0 \\ 0 & r_p & & \cdot & r_1 & r_0 & r_1 & & & r_{m-3} & r_{m-2} & \cdot & r_p & 0 & 0 & 0 \\ 0 & 0 & r_p & \cdot & r_2 & r_1 & r_0 & \cdot & \cdot & \cdot & & & r_p & 0 & 0 \\ 0 & 0 & 0 & r_p & \cdot & \cdot & \cdot & \cdot & \cdot & \cdot & & & & r_p & 0 \\ 0 & 0 & 0 & 0 & r_p & r_{m-1} & r_{m-2} & \ldots & \ldots & \ldots & r_1 & r_0 & r_1 & \ldots & \ldots & r_p \end{pmatrix} \quad (11)$$

Here $r_i$ equals:

$$r_i = \sum_{j=0}^{p-i} a(j) \cdot a(i+j) \quad (12)$$

If the upper limit of the summation is smaller than zero, $r_i$ has a value equal to zero.

The matrix R may be divided into three sub-matrices $R_l$, $R_m$, $R_r$ where $R_l$ is formed by the p leftmost columns of R, $R_r$ is formed by the p rightmost columns of R and $R_m$ is formed by the remaining m columns of R.

If the vector s is divided into three sub-vectors comprising p, m and p coefficients respectively, (10) may be rewritten as:

$$(R_l, R_m, R_r) \left( \begin{pmatrix} s(0) \\ \vdots \\ s(p-1) \\ 0 \\ \vdots \\ \vdots \\ 0 \end{pmatrix} + \begin{pmatrix} 0 \\ \vdots \\ 0 \\ s(p) \\ \vdots \\ s(p+m-1) \\ 0 \\ \vdots \\ 0 \end{pmatrix} + \begin{pmatrix} 0 \\ \vdots \\ \vdots \\ 0 \\ s(p+m) \\ \vdots \\ s(2p+m-1) \end{pmatrix} \right) - A\underline{q} = \underline{0} \quad (13)$$

The elements of the three sub-vectors of s which are unequal to zero may be defined as subvectors $s_l$, $s_m$, $s_r$. For these sub-vectors the following then holds:

$$\underline{s_l} = \begin{pmatrix} s(0) \\ \vdots \\ s(p-1) \end{pmatrix}, \quad (14)$$

$$\underline{s_m} = \begin{pmatrix} s(p) \\ \vdots \\ s(p+m-1) \end{pmatrix}, \quad \underline{s_r} = \begin{pmatrix} s(p+m) \\ \vdots \\ s(2p+m-1) \end{pmatrix}$$

Utilizing (14), (13) is transposed into:

$$R_m \underline{s_m} = A\underline{q} - R_l \underline{s_l} - R_r \underline{s_r} \quad (15)$$

The matrix $R_m$ is a square matrix of m by m. $R_m$ is symmetrical, definitely positive and Toeplitz. The right-hand member of (15) represents a vector of known components. Due to said properties of ($R_m$), (15) can be computed by various known methods. One of these methods is, for example, the Levinson algorithm described in the book entitled "Fast Algorithms for Digital Signal Processing, by R. E. Blahut, Addison-Wesley Publishing Company Inc. 1985, ISBN 0-201-10155-6, pages 352–358.

Depending on the values of p and m the structure of the matrices $R_l$, $R_m$ and $R_p$ may change. The matrix $R_m$ has the following structure for values of $m \leq p+1$:

$$R_m = \begin{pmatrix} r_0 & r_1 & r_2 & \ldots & \ldots & r_{m-2} & r_{m-1} \\ r_1 & r_0 & r_1 & & & r_{m-3} & r_{m-2} \\ r_2 & r_1 & & & & & \cdot \\ \cdot & & \cdot & & \cdot & & \cdot \\ \cdot & & & \cdot & & & \cdot \\ \cdot & & & & \cdot & & \cdot \\ r_{m-2} & & & & \cdot & r_0 & r_1 \\ r_{m-1} & r_{m-2} & \ldots & \ldots & r_2 & r_1 & r_0 \end{pmatrix} \quad (16)$$

For m>p the structure of the matrix $R_m$ becomes:

$$R_m = \begin{pmatrix} r_0 & r_1 & r_2 & \ldots & \ldots & r_{p-1} & r_p & 0 & 0 \\ r_1 & r_0 & r_1 & & & r_{p-2} & r_{p-1} & r_p & 0 \\ r_2 & r_1 & & & & & & & \cdot \\ \cdot & \cdot & & & & & & & \cdot \\ \cdot & & & & & & & & \cdot \\ \cdot & & & & & & & & \cdot \\ \cdot & & & & & & & & \cdot \\ \cdot & & & & & & & & \cdot \\ r_p & r_{p-1} & & & & & & \cdot & \cdot \\ 0 & r_p & r_{p-1} & & & & & r_0 & r_1 \\ 0 & 0 & r_p & r_{p-1} & \ldots & \ldots & r_2 & r_1 & r_0 \end{pmatrix} \quad (17)$$

The structure of the matrices $R_l$ and $R_r$ also depends on the values of m and p. For m <p the following holds for the matrices $R_l$ and $R_r$:

$$R_l = \begin{pmatrix} r_p & \ldots & \ldots & \ldots & r_1 \\ \cdot & & & & \cdot \\ \cdot & r_p & & & \cdot \\ \cdot & & & & \cdot \\ 0 & \ldots & r_p & \ldots & r_m \end{pmatrix} \quad (18)$$

-continued $$R_r = \begin{pmatrix} r_m & \cdots & r_p & \cdots & 0 \\ \cdot & & & & \cdot \\ \cdot & & r_p & & \cdot \\ \cdot & & & & \cdot \\ r_1 & \cdots & \cdots & \cdots & r_p \end{pmatrix}$$

For m=p the matrices $R_l$ and $R_p$ are equal to:

(19)

$$R_l = \begin{pmatrix} r_p & \cdots & \cdots & r_1 \\ & & & \cdot \\ 0 & r_p & & \cdot \\ & & & \cdot \\ 0 & 0 & r_p & \cdot \\ & & & \cdot \\ 0 & 0 & 0 & r_p \end{pmatrix}$$

$$R_r = \begin{pmatrix} r_p & 0 & 0 & 0 \\ \cdot & & & \\ \cdot & r_p & 0 & 0 \\ \cdot & & & \\ \cdot & & r_p & 0 \\ \cdot & & & \\ r_1 & \cdots & \cdots & r_p \end{pmatrix}$$

For m>p, $R_l$ and $R_r$ are transposed into:

(20)

$$R_l = \begin{pmatrix} r_p & \cdots & \cdots & r_1 \\ & & & \cdot \\ 0 & r_p & & \cdot \\ & & & \cdot \\ 0 & 0 & r_p & \cdot \\ & & & \cdot \\ 0 & 0 & 0 & r_p \\ 0 & 0 & 0 & 0 \\ 0 & 0 & 0 & 0 \end{pmatrix}$$

$$R_r = \begin{pmatrix} 0 & 0 & 0 & 0 \\ 0 & 0 & 0 & 0 \\ r_p & 0 & 0 & 0 \\ \cdot & & & \\ \cdot & r_p & 0 & 0 \\ \cdot & & & \\ \cdot & & r_p & 0 \\ \cdot & & & \\ r_1 & \cdots & \cdots & r_p \end{pmatrix}$$

The value of vector q necessary for the solution of (14) is available on the output of the period introducing means 18. The values a(i) necessary in (14) are obtained from the values supplied by channel 4 for the prediction parameters established in the transmitter. The elements of the vector $s_l$ are formed by the most recent-but-one series of received signal samples, while the elements of vector $s_r$ being formed by the most recent series of received signal samples.

Figure 2:
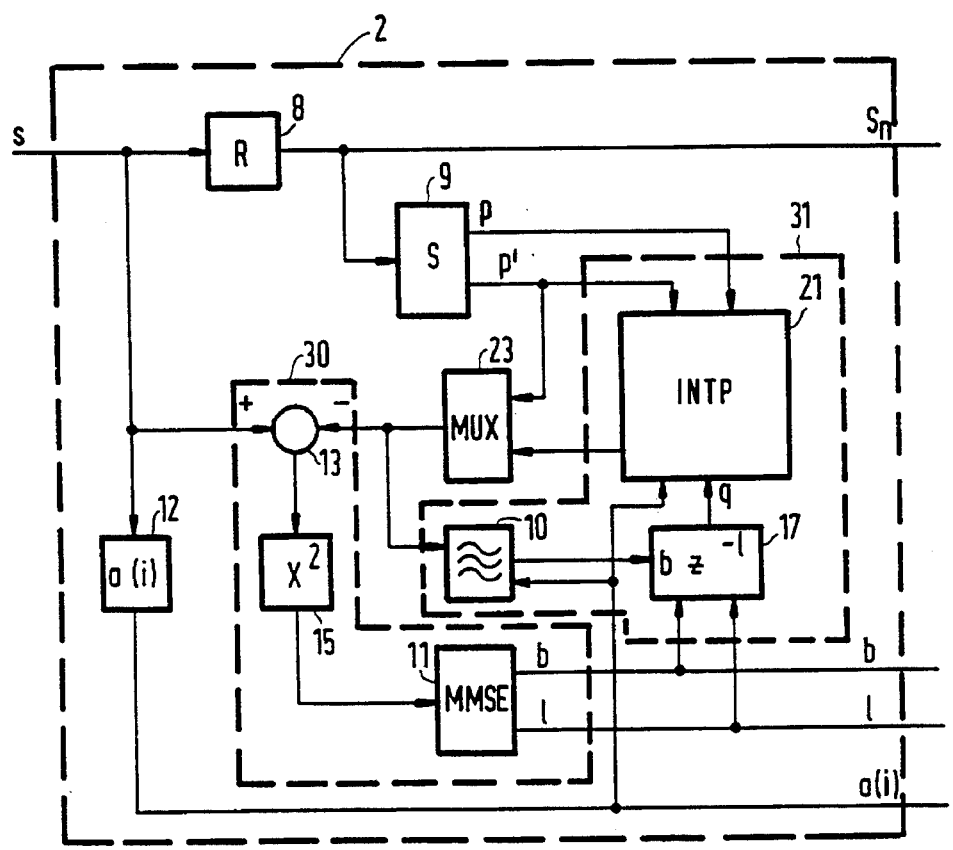
FIG. 2 shows a preferred embodiment for a transmitter to be used in the transmission system shown in FIG. 1.

In the transmitter shown in FIG. 2 the signal samples s(n) to be transmitted are applied to a reducing unit 8, to a first input of the period determining means 30 and to a linear predictor 12. The output of the reducing element 8 is connected to a first sub-channel 4a of the channel 4 and to a local storage unit 9. A first output of the local storage output 9, carrying the most recent series of signal samples for its output signal, is connected to a first input of the local interpolation means 31 and to a first input of the multiplexer 23. A second output of the local storage unit 9, carrying the most recent-but-one series of signal samples for its output signal, is connected to a second input of the local interpolation means 31. An output of the local interpolation means 31 is connected to a second input of the multiplexer 23.

The output of the multiplexer 23 is connected to a third input of the local interpolation means 31 and to a second input of the period determining means 30. The output of the linear predictor 12 is connected to a sub-channel 4d of the channel 4 and to a first control input of the local interpolation means 31. A first and a second output of the period determining means 30 are connected to a sub-channel 4b, 4c respectively, and to a second and a third control input of the local interpolation means 31.

The first input of the local interpolation means 31 is connected to a first input of a local interpolator 21, the second input of the local interpolation means 31 being connected to a second input of the local interpolator 21. The third input of the local interpolation means 31 is connected to an input of an inverse prediction filter 10. The output of the inverse prediction filter 10 is connected to an input of the local period introducing means 17. The output of the local period introducing means 17 is connected to a third input of the local interpolator 21. The first control input of the local interpolation means 31 is connected to a control input of the inverse prediction filter 10 and to a control input of the local interpolator 21. The second and third control inputs of the local interpolating means 31 are connected to a first and a second control input of the local period introducing means 17. A first input of the period determining means 30 is connected to a first input of a subtracter circuit, the second input of the period determining means 30 being connected to a second input of the subtracter circuit 13. The output of the subtracter circuit 13 is connected to an input of a squaring circuit 15. The output of the squaring circuit 15 is connected to the input of period optimizing means 11.

In the transmitter shown in FIG. 2 the period value and the amplitude coefficient are computed by performing in the transmitter a similar interpolation to the one in the receiver shown in FIG. 1. For this purpose, the transmitter 2, just like the receiver 6 in FIG. 1, comprises a local storage unit 9, a multiplexer 23, an inverse prediction filter 10, local period introducing means 17 and a local interpolator 21. This (local) interpolation is performed for different values of b and 1, the final values of the period value and the amplitude coefficient transmitted over the channel being those values at which the mean square of the difference between the signal samples s(n) and the interpolated signal samples s'(n) is minimum. The subtracter circuit 13 computes the difference s(n)−s'(n) and the squaring circuit 15 computes the squared value of this error. The period optimizing means 11 compute the sum of the squared difference for each set value of b and 1, this summation being performed of the interpolated signal samples. In practice it proves to be sufficient to carry out the interpolation for all combinations of 1=20 to 140 in steps equal to 1 and b=0.5 to 1.5 in steps of 0.1. The values of 1 used make it possible to determine a frequency of a periodicity from 50 to 400 Hz for an 8 kHz sampling rate.

The period optimizing means 11 always retain the value of b and 1 at which a minimum sum of the squared difference occurs. If the interpolation for all values of b and 1 has been carded out, the optimum values of b and 1 are transmitted to the receiver 6. The missing signal samples are determined in the local interpolator 21 in the same fashion as they are determined in the receiver 6 shown in FIG. 2.

Figure 3:
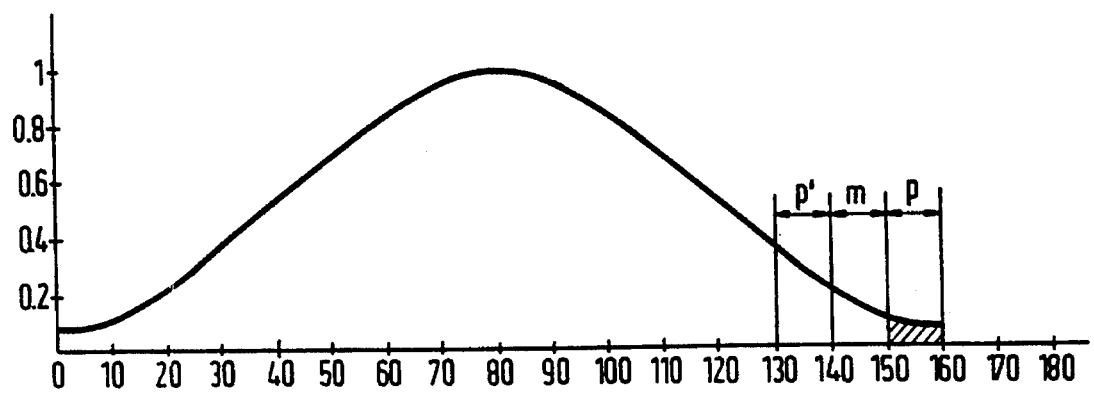
FIG. 3 shows the relative position of a window function used for determining the prediction parameters and a certain series of signal samples.

FIG. 3 shows the window function used by the characterizing means constituted by linear predictor 12 for a series of signal samples p transmitted over the channel 4 at a given instant. The window function w(n) used here is a so-called Hamming window defined by the following relation:

$$w(n) = \begin{cases} 0.54 - 0.46\cos\left(\frac{2\pi n}{L-1}\right) & 0 \le n \le L-1 \\ 0 & n < 0 \ \ \lor \ \ n > L-1 \end{cases} \quad (21)$$

Herein L is the length (in number of signal samples of the window period. FIG. 3 shows that the window function includes of signal samples numbered 1 to 160, whereas only the ten signal samples numbered 151 to 160 form the currently transmitted series of signal samples of transmitter 2. The preceding ten signal samples numbered 141 to 150 are not transmitted, but are to be determined by interpolation in the receiver 6 with the aid of the characteristic parameters and the signal samples numbered 13 1 to 140 already received previously. It is to be noted that the succeeding signal samples transmitted by the transmitter are not subjected to the window function. FIG. 3 distinctly shows that the moment the signal samples numbered 151 to 160 are transmitted no computations need to be made for which signal samples having a higher serial number are necessary, such as in the state-of-the-art transmission system in which the signal samples currently to be transmitted are situated in the middle of the window function. Since no signal samples having a higher serial number are necessary before the signal samples 151 to 160 are transmitted, there may be a limited delay experienced by the signal samples in the transmitter.

Figure 4:
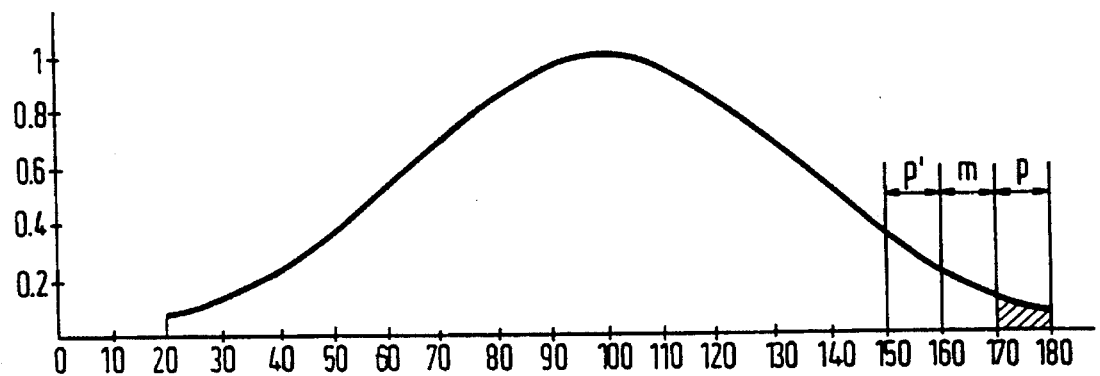
FIG. 4 shows the relative position of the window function and the series of signal samples following the series of signal samples shown in FIG. 3.

FIG. 4 shows the window function used in the characterization means 12 for a series of signal samples p transmitted directly after the series of signal samples shown in FIG. 3. The window function is now computed of the signal samples numbered 21 to 180, the transmitted signal samples being the signal samples numbered 171 to 180. The signal samples numbered 161 to 170 are not transmitted, but computed by interpolation in the receiver 6 from the previously received signal samples numbered 151 to 160 and the present signal samples numbered 171 to 180.

Figure 5:
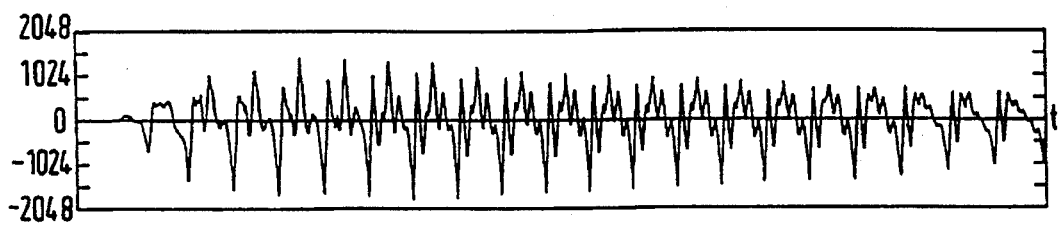
FIG. 5 shows an example of the speech signal transmitted through the transmission system shown in FIG. 1.

FIG. 5 shows a transmit speech signal plotted against time. This speech signal has a time duration of 100 ms. This means that with an 8 kHz sampling rate the speech signal shown in FIG. 5 consists of 800 signal samples.

Figure 6:
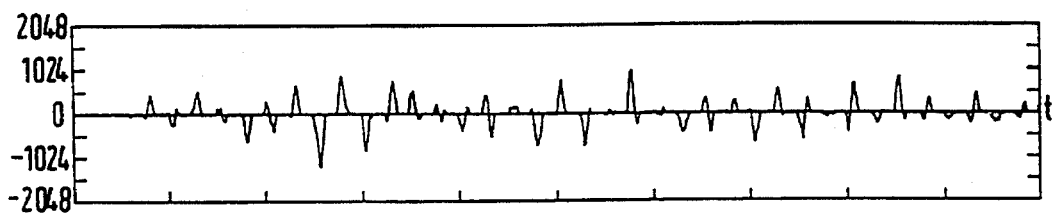
FIG. 6 shows the prediction error e(n) in the receiver plotted against time in a state-of-the-art transmission system.

FIG. 6 shows the interpolation error arising in a state-of-the-art transmission system for which the value of m (the number of missing signal samples) is equal to 10 and p (number of transferred signal samples) is also equal to 10. The characteristic parameters are determined of 160 signal samples while use is made of a Hamming window. FIG. 6 shows that the interpolation error is considerable at locations where periodic (excitation) pulses occur. To obtain a quantitative measure for the quality of the transmission system, a signal-to-noise ratio may be defined as follows:

$$SNR = 10 \log \left( \frac{\sum_{n=0}^{N_1} s(n)^2}{\sum_{n=0}^{N_1} \{s(n) - s'(n)\}^2} \right)$$

The value of the signal-to-noise ratio in the state-of-the-art transmission system is 9.9 dB.

Figure 7:
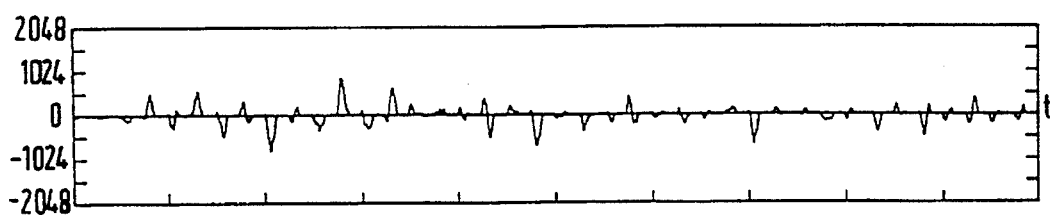
FIG. 7 shows the prediction error e(n) in the receiver plotted against time in a transmission system shown in FIG. 1.

FIG. 7 shows the interpolation error occurring in a transmission system shown in FIG. 1, in which the value of m (the number of missing signal samples) is equal to 10 and p (the number of transferred signal samples) is likewise equal to 10. The characteristic parameters are likewise determined of 160 signal samples while use is made of a Hamming window. The signal samples p are situated here in the middle of the window function. FIG. 7 distinctly shows that the interpolation error is reduced. The value of the signal-to-noise ratio is here 12.5 dB.

Figure 8:
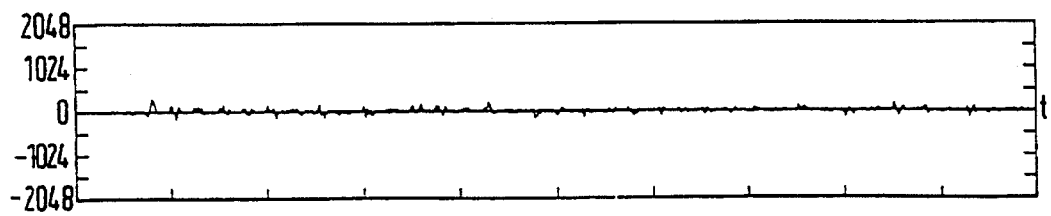
FIG. 8 shows the prediction error e(n) in the receiver plotted against time in a transmission system according to the invention when the transmitter as shown in FIG. 2 is used.

In FIG. 8 is shown the interpolation error found in a transmission system shown in FIG. 1, in which the transmitter shown in FIG. 2 is used. The value of m (the number of missing signal samples) is equal to 10 and p (the number of transferred signal samples) is likewise equal to 10. The characteristic parameters are likewise determined of 160 signal samples, while use is made of a Hamming window. The signal samples p are situated here at the end of the window function. FIG. 8 distinctly shows that the interpolation error is reduced considerably. The value of the signal-to-noise ratio is then 20.7 dB. If the signal samples p are positioned in the middle of the window function, a signal-to-noise ratio of 21.3 dB is found. This means that the degradation of the signal-to-noise ratio by positioning the signal samples at the end of the window function, so that the delay of the signal samples is reduced considerably, continues to be restricted to only 0.6 dB.

We claim:

1. A transmission system for sequentially transmitting successive series of signal samples from a transmitter to a receiver, the transmitter including characterization means for determining parameters characteristic of the signal samples in each series and means for transmitting the characteristic parameters and at least some of the signal samples over a channel to the receiver; the receiver including interpolation means for determining the value of missing signal samples so as to derive successive series of signal samples having characteristic parameters that correspond to the received characteristic parameters, characterized in that:

the transmitter comprises period determining means for determining the period value of a periodicity in the signal samples, which period value exceeds the time duration of each series of signal samples, and means for transmitting the determined period value over the channel to the receiver; and the interpolation means in the receiver comprises period introducing means for introducing a periodicity having the received period value in the single samples derived by the interpolation means.

2. The transmission system as claimed in claim 1, wherein the period determining means in the transmitter also determines an amplitude coefficient of the periodicity, and the period introducing means in the receiver sets the period of the derived signal samples in accordance with said amplitude coefficient.

3. The transmission system of claim 2, wherein the transmitter further comprises: local interpolation means for determining non-transmitted signal samples from transmitted signal samples so as to reconstruct an original series of signal samples, the reconstructed series having characteristic parameters that correspond to the characteristic parameters determined by the characterization means, the local interpolation means comprising local period introducing means for introducing a periodicity having a period value; and period determining means for selecting the period value so that the reconstructed series of signal samples will correspond to the original series of signal samples as closely as possible.

4. The transmission system as claimed in claim 2, wherein the characterization means comprise window means for weighting a succession of series of signal samples with a window, so that the characteristic parameters are determined, and the series of transmitted signal samples comprises the last signal sample of the weighted series.

5. The transmission system of claim 1, wherein the transmitter further comprises: local interpolation means for determining non-transmitted signal samples from transmitted signal samples so as to reconstruct an original series of signal samples, the reconstructed series having characteristic parameters that correspond to the characteristic parameters determined by the characterization means, the local interpolation means comprising local period introducing means for introducing a periodicity having a period value; and period determining means for selecting the period value so that the reconstructed series of signal samples will correspond to the original series of signal samples as closely as possible.

6. The transmission system as claimed in claim 5, wherein the characterization means comprise window means for weighting a succession of series of signal samples with a window, so that the characteristic parameters are determined, and the series of transmitted signal samples comprises the last signal sample of the weighted series.

7. The transmission system as claimed in claim 1, wherein the characterization means comprise window means for weighting a succession of series of signal samples with a window, so that the characteristic parameters are determined, and the series of transmitted signal samples comprises the last signal sample of the weighted series.

8. A transmitter for sequentially transmitting successive series of signal samples, including characterization means for determining parameters characteristic of the signal samples, and means for transmitting the characteristic parameters and at least some of the signal samples; characterized in that the transmitter further comprises period determining means for determining the period value of a periodicity in the signal samples, which period value is larger than the time duration of each series of signal samples, and means for transmitting the period value over a channel to a receiver.

9. A receiver for receiving successive series of signal samples transmitted over a communication channel, which receiver includes: means for receiving from the transmission channel parameters characteristic of the signal samples, and interpolation means for determining the value of missing signal samples so as to derive successive series of signal samples having characteristic parameters that correspond to the received characteristic parameters; characterized in that the receiver further comprises means for receiving from the communication channel a period value of a periodicity in the signal samples, which period value exceeds the time duration of each series of signal samples, and the interpolation means comprises period introducing means when introducing a periodicity having the received period value in the signal samples derived by the interpolation means.

10. A coder for coding signal samples in successive series of signal samples, comprising: characterization means for determining parameters characteristic of the signal samples; means for coding the characteristic parameters and at least some of the signal samples; period determining means for determining the period value of the periodicity in the signal samples, which period value exceeds the time duration of each series of signal samples; and means for coding the period value.

11. A decoder for decoding successive series of coded signal samples, comprising: means for decoding parameters characteristic of the signal samples and decoding coded signal samples; interpolation means for determining the values of missing signal samples so as to derive successive series of signal samples having characteristic parameters that correspond to the decoded characteristic parameters, characterized in that the decoder comprises means for decoding a period value of a periodicity in the signal samples, which period value exceeds the time duration of each series of signal samples; and the interpolation means comprises period introducing means for introducing a periodicity having the received period value in the signal samples derived by the interpolation means.

12. A decoder as claimed in claim 11, further comprising means for weighting any given series of signal samples with a window function covering a succession of signal samples which overlaps the given series, to thereby determine the characteristic parameters; the given series of signal samples comprising the most recent of the series of signal samples in said succession.

13. An interpolator for deriving by interpolation signal samples which are missing from an original sequence of series of signal samples, the values of missing signal samples being determined so as to result in a reconstructed sequence of series of signal samples which have characteristic parameters which correspond to the characteristic parameters of the sequence, said interpolator comprising period determining means for determining a period value of the original sequence, and period introducing means for introducing a periodicity in the reconstructed sequence having a period value which corresponds to said period value of the original sequence, which period value exceeds the time duration of each series of signal samples in the original sequence.

* * * * *